(No Model.) 6 Sheets—Sheet 1.
H. B. WILLIAMS.
PARCEL CARRIER.
No. 434,222. Patented Aug. 12, 1890.
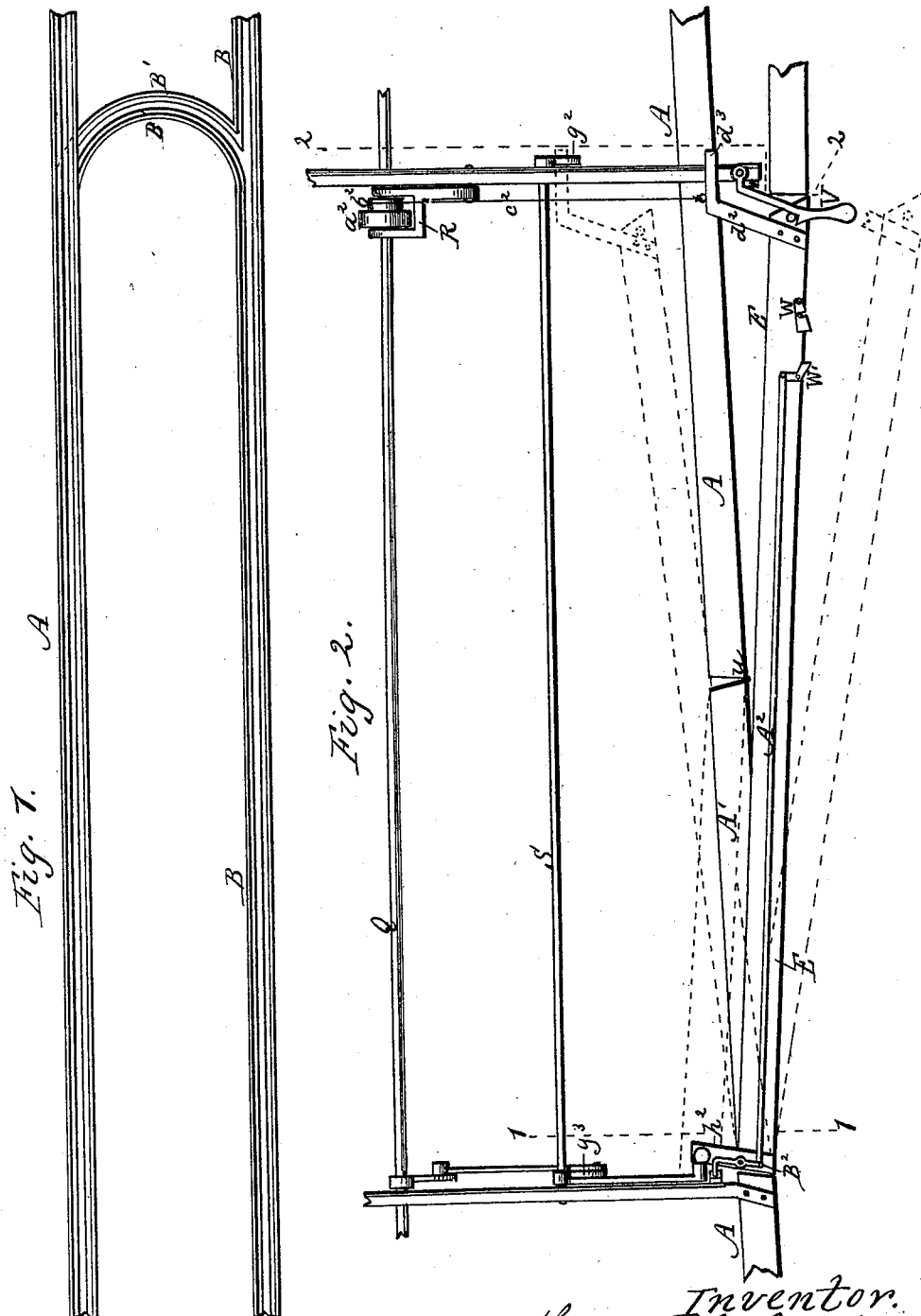
Witnesses.
Chas. De Sidour
E. N. Adam
Inventor.
Henry B. Williams,
per R. F. Osgood,
Atty.

(No Model.) 6 Sheets—Sheet 2.

H. B. WILLIAMS.
PARCEL CARRIER.

No. 434,222. Patented Aug. 12, 1890.

Witnesses. Inventor.
Chas. H. Widmer Henry B. Williams,
E. N. Adams pr R. F. Osgood.
Atty.

(No Model.) 6 Sheets—Sheet 3.
H. B. WILLIAMS.
PARCEL CARRIER.
No. 434,222. Patented Aug. 12, 1890.
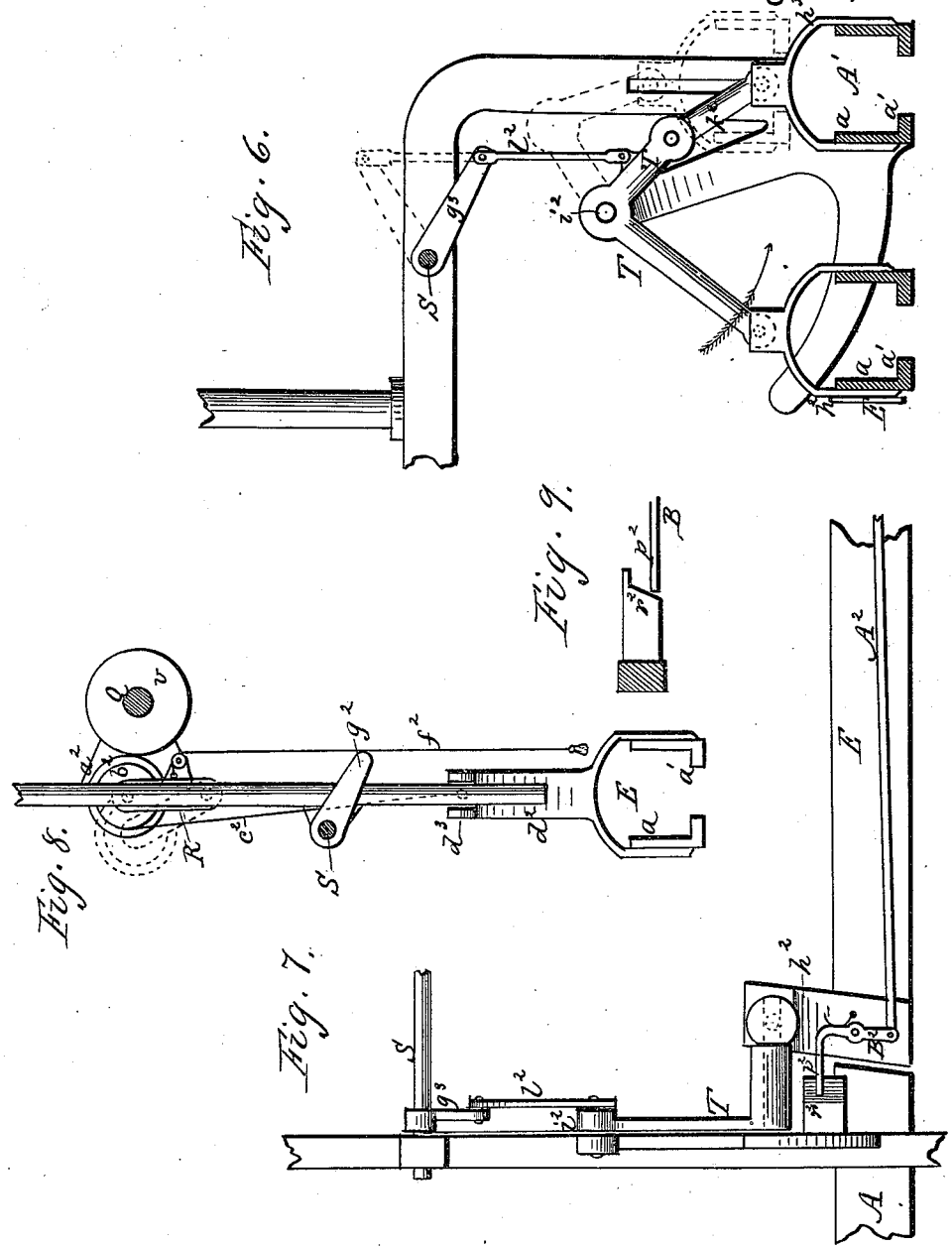
Witnesses.
Chas. B. Sidner.
E. N. Adams.
Inventor.
Henry B. Williams,
per R. F. Osgood,
Atty.

(No Model.) 6 Sheets—Sheet 4.
H. B. WILLIAMS.
PARCEL CARRIER.
No. 434,222. Patented Aug. 12, 1890.
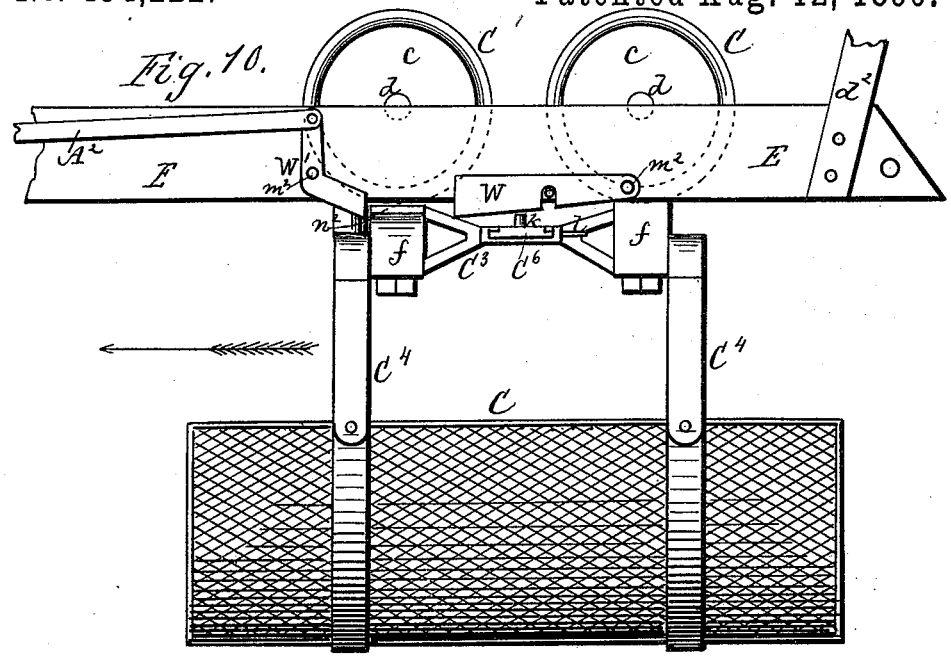
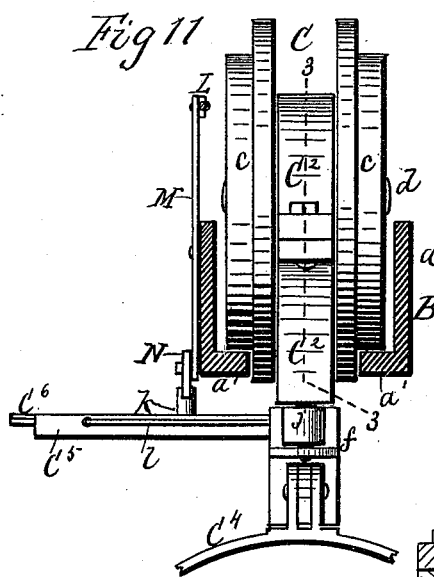
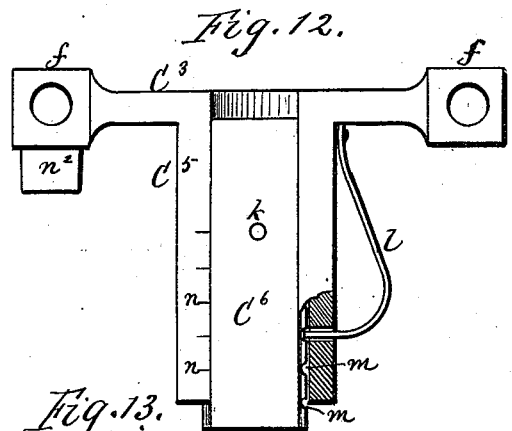
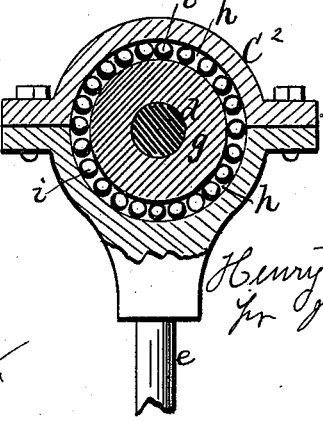
Witnesses.
Chas. A. Widener
E. N. Adams
Inventor.
Henry B. Williams,
per R. F. Osgood,
Atty.

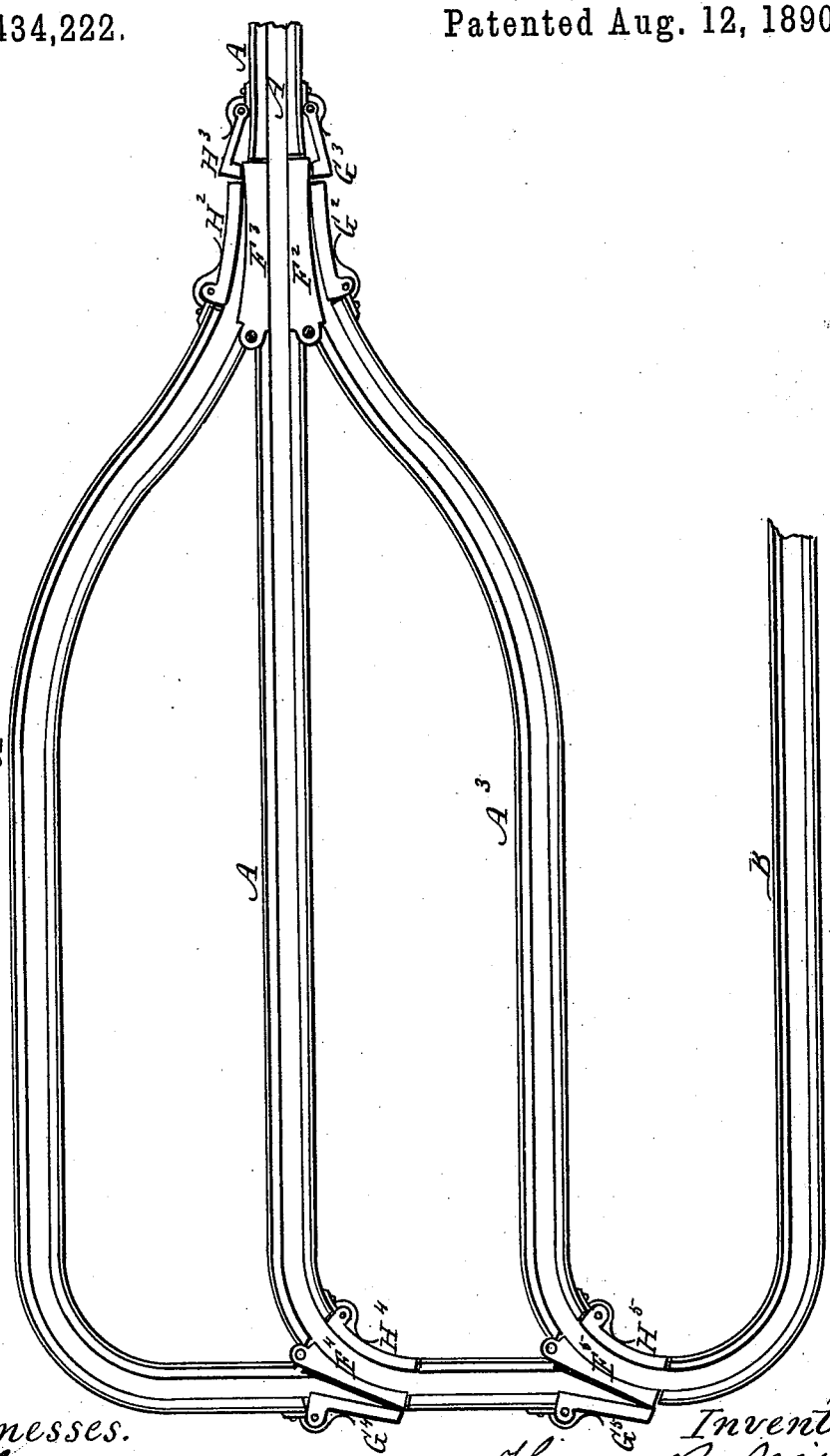

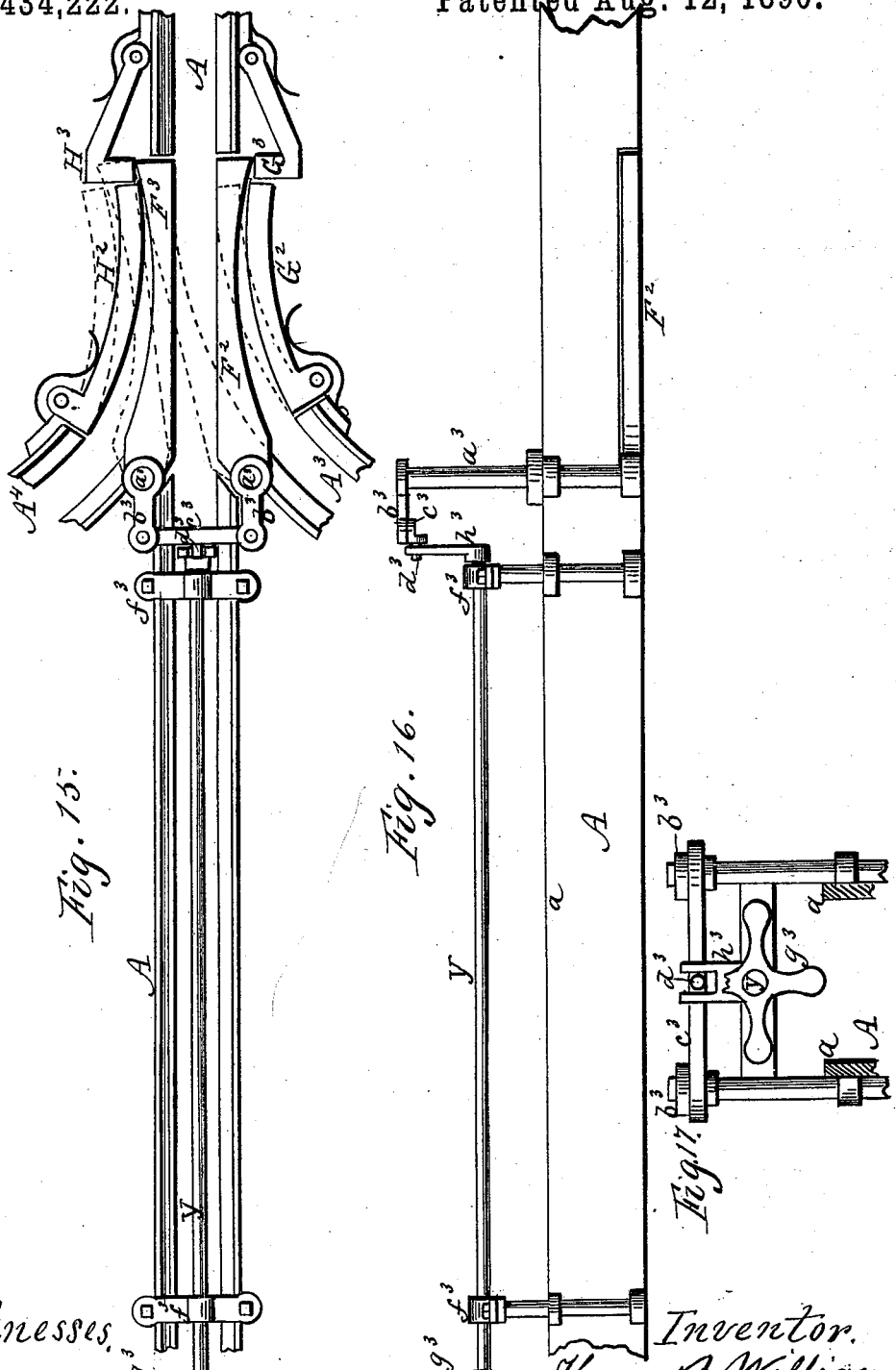

UNITED STATES PATENT OFFICE.

HENRY B. WILLIAMS, OF ROCHESTER, NEW YORK, ASSIGNOR OF ONE-HALF TO LEMUEL A. JEFFREYS, OF SAME PLACE.

PARCEL-CARRIER.

SPECIFICATION forming part of Letters Patent No. 434,222, dated August 12, 1890.

Application filed February 28, 1890. Serial No. 342,160½. (No model.)

*To all whom it may concern:*

Be it known that I, HENRY B. WILLIAMS, of Rochester, in the county of Monroe and State of New York, have invented a certain new and useful Improvement in Parcel-Carriers; and I do hereby declare that the following is a full, clear, and exact description of the same, reference being had to the drawings accompanying this application.

My improvement relates to parcel-carriers for stores; and it consists in the construction and arrangement of parts, hereinafter described and claimed.

Figure 3:
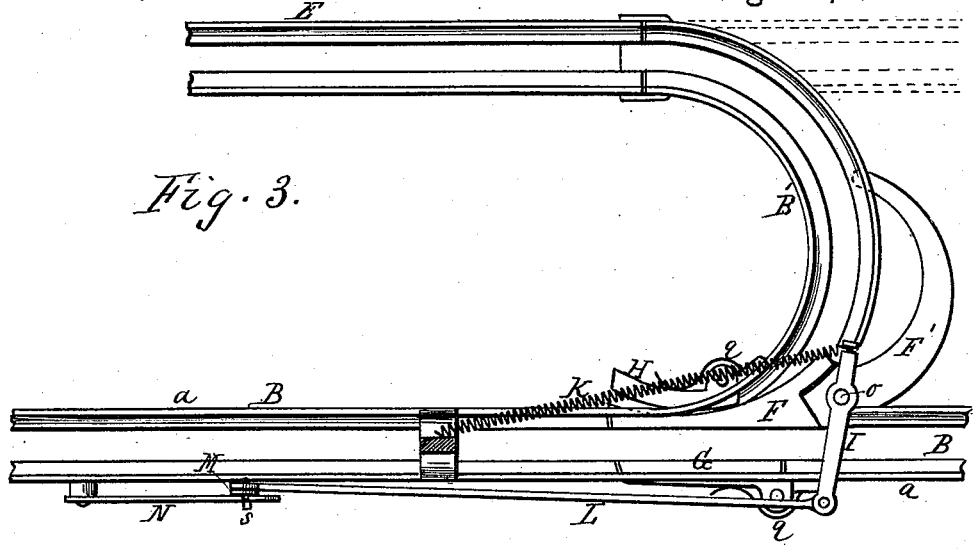
Figure 4:
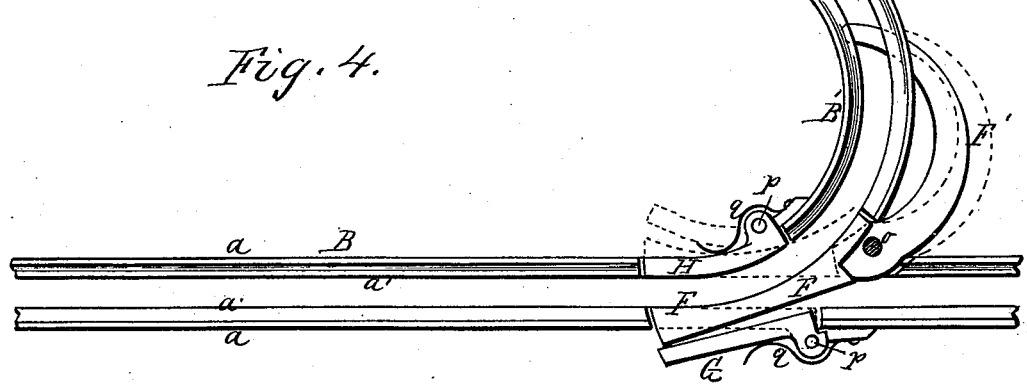
Figure 5:
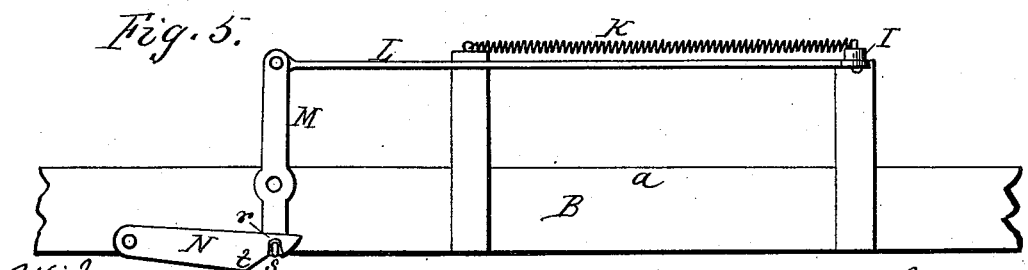

In the drawings, Figure 1 is a diagram showing a plan view of the two tracks or ways for carrying the goods in opposite directions, also the switch-bend at one of the stations. Fig. 2 is an enlarged side elevation of a portion of the track A, that leads from the purchasing-counter to the cashier's station, and exhibiting more particularly the devices for raising the carrier in position to be run to the last-named station. Fig. 3 is an enlarged plan view of a portion of the track B, that leads from the cashier's station to the purchasing-counter, exhibiting, also, the switch-bend in the track and the devices for deflecting the carrier at that point. Fig. 4 is a view similar to Fig. 3, but showing the devices for operating the switch removed from place. Fig. 5 is a side elevation of Fig. 3. Fig. 6 is an enlarged cross-section in line 1 1 of Fig. 2. Fig. 7 is a side elevation of Fig. 6. Fig. 8 is a cross-section in line 2 2 of Fig. 2. Fig. 9 is a diagram showing a plan view of the cam-piece $r^2$ for releasing the mechanism that holds the carrier on the elevator-section of the track. Fig. 10 is an enlarged side elevation of the carrier-elevator and the carrier in place thereon. Fig. 11 is a cross-section of the track B and an end elevation of the upper portion of the carrier, showing the trucks resting in the track. Fig. 12 is a diagram showing a plan view of the carrier-frame, the trucks being removed from place. Fig. 13 is a cross-section of the truck-bearing of the carrier in line 3 3 of Fig. 11. Fig. 14 is a plan view of the tracks at the cashier's station. Fig. 15 is a plan view of the apparatus at the cashier's station for throwing the switches to connect with the side tracks. Figs. 16 and 17 are a side elevation and an end elevation, respectively, of Fig. 15.

A indicates the track or way that extends from the purchasing-counter to the cashier's station, and B indicates the return-track. These tracks are set at reverse inclines, so that the carrier will run forward and back by its own gravity. Each of the tracks A B consists of a trough composed of two vertical sides $a$ $a$ and two inwardly-projecting flanges $a'$ $a'$, which latter form the treads on which the carrier-wheels run.

C is the carrier, consisting of a basket or other receptacle and provided with two trucks $C'$ $C'$, that run one in advance of the other in the tracks A B. Each of the trucks consists of two flanged wheels $c$ $c'$, similar to car-wheels, that run on the flanges $a'$ $a'$. One of these wheels is attached fast to the axle $d$, and the other turns loosely thereon, whereby the wheels can turn curves without binding or slipping. The body of the wheels lies within the trough of the track, and therefore can never get out of place, thus avoiding the difficulty that occurs in common carriers from jumping the track. $C^2$ is a circular bearing or hanger that rests around the axle $d$, and is provided at its lower end with a circular journal $e$, that fits and turns loosely in a knuckle $f$ of the frame $C^3$ of the carrier. The frame is provided with two of these knuckles, in which the journals of the two trucks rest; hence both trucks are swiveled so that they can turn readily in passing curves. To the frame are attached rings or loops $C^4$ $C^4$, that support the receptacle C. Inside the circular bearing $C^2$ is a circular head $g$, secured to the axle $d$, Fig. 13, and in the bearing and head is made a circular groove $h$, in which rest a series of anti-friction balls $i$ $i$, to relieve the friction as the tread-wheels revolve. The carrier-body is also provided with a horizontally-projecting bed $C^5$, Figs. 11 and 12, in which slides in and out a gage-plate $C^6$, provided with an upright stud $k$, by which the switch mechanism is operated, as will be presently described. The gage-plate is held at any adjustment by suitable means, that shown in the drawings being a spring $l$, Fig. 12, that strikes into notches $m\ m$ of the plate. If desired, index-lines $n\ n$ may be used on the bed to indicate the proper position in adjusting.

B', Figs. 1, 3, and 4, is one of the switch-bends in track B leading to track A. There are as many of these bends as there are stations in the track. Each of these bends runs from track B down to a lower level and connects at the lower end with an elevating-section E, Fig. 2, which when raised forms a section of the track A. The carrier when switched off from the track B in coming from the cashier's station runs around bend B, and thence onto the end of section E, and in this position is ready to be raised and run onto the track A, to return to the cashier's station.

F, Fig. 4, is the switch located at the junction of the bend B' with main track B, and serving to switch the carrier onto the bend. It consists of a tongue, which is curved on its inner side and straight on its outer side, and is pivoted at $o$, so as to swing from one side to the other of the track. When turned out, as shown in full lines, Fig. 4, the curve on the inner side corresponds with the curve of the bend B', and it then switches the carrier into the bend. When turned in, as shown in dotted lines in the same figure, it cuts off the passage to the bend, and the carrier is forced to run along the main track to another station.

G and H are two filling-pieces—one on the outer and the other on the inner side of the track B—that on the outer side being straight and that on the inner side being curved, said pieces being pivoted at $p\ p$, so as to swing out and in, and being pressed inward by springs $q\ q$. When the switch F is thrown, the filling-piece in front of it will be thrown out by the contact, and the one in the rear will be forced in by its spring to fill the space before occupied by the switch. The object of this arrangement is to fill the spaces occupied by the switch when thrown from one side to the other and prevent any break in the track that would obstruct the carrier. On the rear end of the switch F is a curved tongue F', which, when the switch is thrown out to switch the carrier onto the bend, is thrown in across the path of the carrier after it has passed onto the bend, as shown in Fig. 4. When the carrier strikes this curved tongue, it forces it out, thereby turning the switch in and cutting off the passage to the bend and completing the passage on the main line, ready to allow the passage of carriers to remoter stations.

The switch F may be operated by any suitable means through the medium of the carrier. That shown in the drawings consists of the following:

I, Fig. 3, is a rock-lever attached fast to the top of the pivot $o$ of the switch F.

K is a coiled spring attached at one end to the inner end of the rock-lever and at the other to some stationary part of the frame. The tendency of this spring is to draw the switch F outward into the position shown in full lines, Fig. 3.

L is a connecting-rod attached at one end to the outer end of rock-lever I, the other end being pivoted to an upright lever M, pivoted centrally to the track B in advance of the switch-bend B.

N is an arm forming a trigger pivoted at one end to the track B and provided at the other with a notch $r$, which catches over a pin $s$ of lever M. This holds lever M against the tension of spring K. The trigger N stands in such a position that its lower edge $t$ is inclined, Fig. 5, and projects below the bottom of track B and stands in line with the pin $k$ on the carrier. When the carrier comes along from the cashier's station, the pin $k$ strikes trigger N, trips the same, releases the lever M and the spring K, then draws on rock-arm I and shifts the switch F from the position shown in Fig. 3 to that shown in Fig. 4, and when the carrier arrives at the switch it is deflected onto the bend B'. In passing along the bend a roller $j$, Figs. 10 and 11, on the frame of the carrier strikes the curved tongue F' of the switch, throwing the same out, changing the switch back to its original position in line with the main track, and resets the lever M with the trigger N, ready for another operation. The pins or studs $k$ on the carrier can be adjusted outward, as before described; hence the carriers which go to other stations than that above described have their pins adjusted so that they will not strike the trigger N, but will strike other triggers at their respective stations. Any number of carriers can therefore be run on the same track without interference.

After passing bend B' the carrier C runs onto the elevating-section E, and is retained there ready to be elevated and run onto the reverse track A. The section E is a loose section movable at both ends. The end next to the bend B' is simply raised and lowered vertically, while the opposite or remoter end is not raised and lowered, but is thrown out and in laterally to connect with and disconnect from the main track A. There is also located in the main track A, above the section E, a section A', which forms a part of the main track, but is pivoted at $u$, Fig. 2, leaving the opposite or remoter end to rise and fall vertically. When the section E is lowered and disconnected from track A and in condition to receive the carrier C, the hinged section A' is in place and forms a continuation of track A, allowing other carriers to pass without obstruction; but when section E is elevated at one end and thrown in at the other to connect with main track A, then the free end of section A' is thrown up, as indicated by dotted lines, Fig. 2, to give room for the entrance of the end of section E. In this position section E also stands inclined, and its carrier when released runs down onto the main track.

The sections E A' may be operated by any suitable means, that shown in the drawings being as follows: Q, Figs. 2 and 8, is a shaft located above track A, and extending the whole length of the track, being provided with universal couplings or bevel-gears at the curves. $v$ are friction-gears on said shaft located over the stations. R is a pivoted bearing over each station provided with a friction-gear $a^2$, that engages with gear $v$, and a pulley $b^2$, on which winds a cord or chain $c^2$, attached at its lower end to a yoke $d^2$, which supports the induction end of the section E. The bearing R is drawn forward to bring the gears $v$ $a^2$ into engagement by drawing on a cord $f^2$. This action winds up cord $c^2$ and elevates the end of section E. S, Fig. 2, is another short shaft located over each station, having its bearings in the hangers that support the track, and provided at opposite ends with crank-arms $g^2$ and $g^3$. The yoke $d^2$, which supports the vertically-movable end of section E, has a projection $d^3$, which rests under crank-arm $g^2$, and when raised said projection strikes said crank-arm and trips it and the other crank-arm $g^3$ by the turning of shaft S. $h^2$ $h^3$ are two yokes at the opposite or swinging end of section E. The yoke $h^2$ embraces the end of section E, and yoke $h^3$ the vertically-movable end of section A'. T, Fig. 6, is a stiff elbow pivoted to the hanger at $i^2$. To one end of this elbow is jointed the yoke $h^2$, and with the other is connected the yoke $h^3$, by means of a connecting-arm $k^2$. It will be seen that when yoke $h^2$ is swung in yoke $h^3$ will be raised. $l^2$ is a connecting-rod jointed at one end to elbow T and at the other to the crank-arm $g^3$ on shaft S.

By the means above described the same power that elevates one end of section E throws the other in laterally, and at the same time raises the free end of section A' out of the way.

V, Fig. 2, is a spring-catch for holding the end of section E and preventing it from falling too low. In case it is desired to lower the section below its natural stop the catch can be sprung back, letting the section down, as indicated by dotted lines at the bottom in Fig. 2.

W and W', Figs. 2 and 10, are two latches pivoted at $m^2$ $m^2$ to the section E, and standing at such distance apart as to receive between them a lug $n^2$, Figs. 10 and 12, of the carrier-body $C^3$, when the carrier is brought round onto said section. The ends of the latches project below the track, so as to engage and hold the carrier in place when it is elevated. The latch W is simply a gravity-latch, and the lug passes under it and raises it, and it then drops back to place behind the lug.

$A^2$ is a connecting-rod jointed at one end to the top of latch W', thence extending along the section E to its farther end, and there jointed to the lower end of a rock-lever $B^2$, Fig. 7, which is pivoted centrally to the end of section E. The upper end of rock-lever $B^2$ has a right-angled arm $p^2$, which rests in front of a wedge-shaped cam-piece $r^2$, attached to the hanger or some stationary part. Fig. 9 shows a top view of the cam-piece and the end of the arm. When the farther end of section E is moved inward to engage with main track A, as before described, the end of arm $p^2$ strikes the cam-piece $r^2$, thereby tripping the lever $B^2$, drawing on the connecting-rod $A^2$, and consequently raising the latch W', so that it frees from the lug $n^2$ of the carrier and allows the carrier to run down on the incline of section E and thence onto the main track A.

$A^3$ $A^4$, Figs. 14 and 15, are branch tracks at the cashier's station connecting with the main tracks A B and so arranged that the carriers can be switched off onto the branch tracks, thereby giving room where there is an accumulation of the carriers under rapid work. These tracks are all connected, as shown in Fig. 14, so that the carriers can be run onto them from the main track A, and then can all be run onto the return-track B without removing the carriers from the tracks, the whole being accomplished by suitable switches at the junctions of the tracks.

$F^2$ $F^3$, Figs. 13 and 14, are two switches, similar to switch F, located at the junction of the branch tracks $A^3$ $A^4$ with the main track A, said switches having concave outer sides and straight inner sides, like switch F. These switches $F^2$ $F^3$ are thrown from one side to the other to bring the concave side in line with the bend of the branch track on which the carrier is to be run, as indicated by the dotted lines, Fig. 15. When one switch is thrown over to thus connect with the branch track, it pushes the other switch outward out of the way. When the two switches stand straight, as shown in full lines, Fig. 15, the branch tracks are shut off and the carrier runs in on the straight central track. Filling-blocks $G^2$ and $H^2$ are used on the opposite sides of the switches $F^2$ $F^3$, said filling-blocks operating in the same manner as the filling-blocks G H, before described. In addition to these filling-blocks auxiliary filling-blocks $G^3$ $H^3$ are used, hinged to the main track A, the same consisting of thin heads which shut in and close the narrow spaces not filled by the filling-blocks $G^2$ $H^2$.

In throwing the switches $F^2$ $F^3$ over from one side to the other a space is left between the end of the switch so thrown over and the end of the space in which the other switch rested before being pushed out, owing to the fact that the pivot on which the switch so thrown over turns being located on one side, and this space is filled by the auxiliary filling-block just described.

The switches $F^2$ $F^3$ are attached to short shafts $a^3$ $a^3$, having crank-arms $b^3$ $b^3$ attached at their upper ends. The outer ends of the two crank-arms are connected by a connecting-rod $c^3$ pivoted thereto, said rod being provided with a projecting pin $d^3$.

Y is a rod resting in suitable bearings $f^3 f^3$ of the track A, provided at its outer end with a handle $g^3$ by which it is turned, and at its inner end with a crank-arm $h^3$, which connects with the pin $d^3$ of the connecting-rod $c^3$. By this means it will be seen that the switches $F^2 F^3$ will be thrown by the turning of shaft Y, thereby deflecting the carriers onto the side tracks whenever desired. The hand-wheel is located within easy reach of the operator.

The junctions of the several tracks A $A^3 A^4$ at the outer end of the line are provided with switches $F^4 F^5$, and with filling-blocks $G^4 G^5 H^4 H^5$, similar to those before described, but acting automatically by the pressure of the carrier-wheels to allow the carrier to pass straight forward onto the return-track B.

Having described my invention, what I claim as new, and desire to secure by Letters Patent, is—

1. In a parcel-carrier apparatus, the combination, with the main track B, which leads from the cashier's station, of a switch located at the shunt pivoted to swing from one side to the other of the track, and spring filling-pieces on opposite sides arranged to fill the spaces vacated by the switch in swinging from one side to the other, as herein shown and described.

2. In a parcel-carrier apparatus, the combination of a swinging switch located at the shunting-station, a spring connected with said switch for throwing the switch to one side of the track, and mechanism connecting the switch with a trigger on the track, as herein shown and described.

3. In a parcel-carrier apparatus, the combination of the swinging switch F, the reacting spring K connected therewith, the trigger N, the rock-lever M, and connecting-rod L, as shown and described, and for the purpose specified.

4. In a parcel-carrier apparatus, the combination, with the main track A, leading to the cashier's station, of a hinged section located therein capable of vertical movement at its free end, an elevating-section located below said main track, vertically movable at one end and laterally movable at the other, and means for operating said sections so that when the elevating-section is raised to lift the carrier the opposite end is thrown in, in connection with the main track, and the hinged section is disconnected from the same, as herein shown and described.

5. In a parcel-carrier apparatus, the combination, with the section E, of the shaft S, located above the section, provided with crank-arms $g^2 g^3$ at opposite ends, the yoke $d^2$ at the vertically-movable end of said section, provided with a projection $d^3$ for tripping crank-arm $g^2$, and a connecting-rod connecting crank-arm $g^3$ with mechanism for swinging the opposite end of section E, as herein shown and described.

6. The combination, with the carrier C, provided with lug $n^2$, of the latches W W', pivoted to the elevating-section E, the connecting-rod $A^2$, jointed to latch W and extending to the opposite end of section E, the rock-lever $B^2$, to which said connecting-rod is attached, and the cam-piece $r^2$, against which the right-angled end of said rock-lever rests, as shown and described, and for the purpose specified.

7. A carrier having the two trucks C' C', each consisting of two wheels $c c'$, one fast to its axle, the other turning freely thereon, and the central hanger-bearing $C^2$, resting on the axle between the wheels and provided with anti-friction balls $i i$, as shown and described, and for the purpose specified.

8. In a parcel-carrier apparatus, the combination, with the main track A and branch tracks $A^3 A^4$, of two switches located at the junction and capable of shifting from one side to the other, and two filling-blocks operating in connection with the switches for filling the spaces behind the switches when thrown, as herein shown and described.

9. In a parcel-carrier apparatus, the combination, with the main track A and branch tracks $A^3 A^4$, of two switches located at the junction of said tracks and capable of being shifted from one side to the other, two filling-blocks located on opposite sides of the switches, and two auxiliary filling-blocks also located on opposite sides of the switches and arranged to operate in the manner and for the purpose specified.

In witness whereof I have hereunto signed my name in the presence of two subscribing witnesses.

H. B. WILLIAMS.

Witnesses:
R. F. OSGOOD,
S. B. SMITH.